J. Porter,
Wool Press.
N°56,443. Patented July 17, 1866.
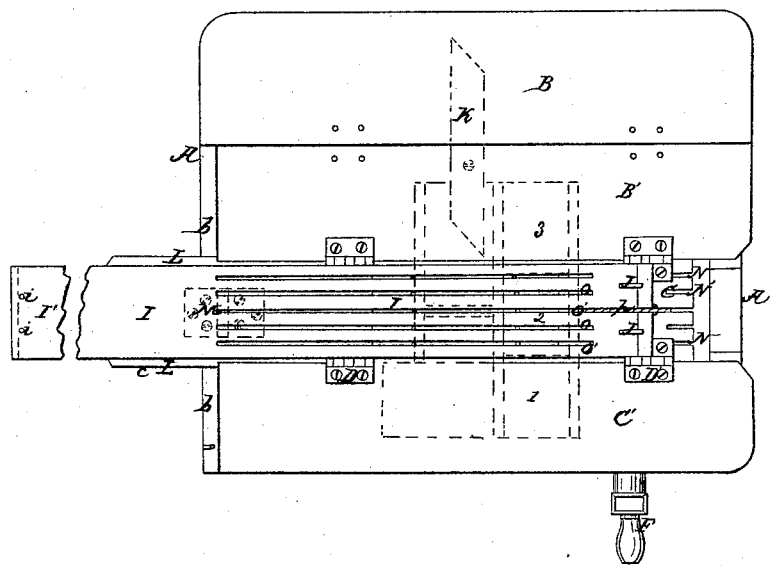
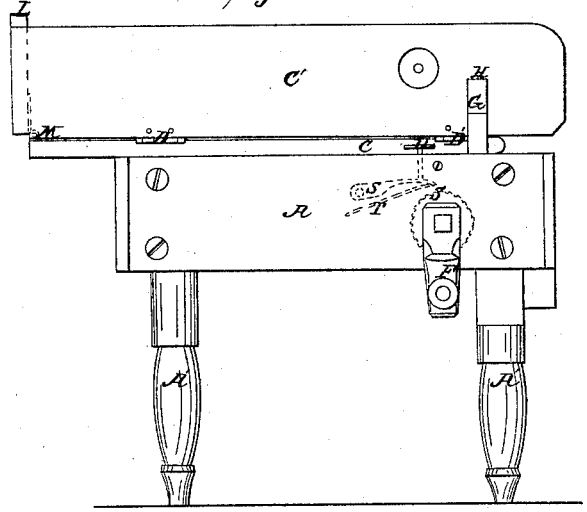
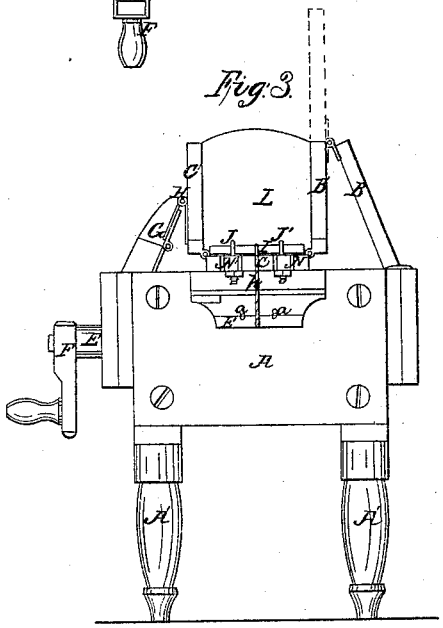
Witnesses
W. H. Burridge
Frank Alden
Inventor
John Porter

UNITED STATES PATENT OFFICE.

JOHN PORTER, OF RUGGLES, OHIO.

IMPROVEMENT IN MACHINES FOR FOLDING FLEECES OF WOOL.

Specification forming part of Letters Patent No. 56,443, dated July 17, 1866.

*To all whom it may concern:*

Be it known that I, JOHN PORTER, of Ruggles, in the county of Ashland and State of Ohio, have invented certain new and useful Improvements in Fleece-Folders; and I do hereby declare that the following is a full and complete description of the same, reference being had to the accompanying drawings, making a part of this specification, in which—

Figure 1 is a top view of the folder. Fig. 2 is a side view. Fig. 3 is a front end view.

Like letters of reference refer to like parts in the views.

A represents the frame of the folder, and is in shape an oblong square, being supported on legs A', as shown.

The top of the table or folder is made in four parts or sections, B B' C C', in Fig. 1. The section C is permanently secured to the top of the frame, and, as will be observed, does not reach quite to the front end. The reason will be hereinafter described. C' is connected to C by a pair of hinges, D D', which permit of its being turned upward, as shown in Fig. 3. The section B is also connected to C by hinges, and can be turned up in the same direction. B is connected to the section B' in the same manner, excepting the hinges are on the under side of the top, which allows it to drop down at the side of the frame, as the leaf of an ordinary table. The relative position and connection of the several sections to each other, and which constitute the whole top of the table, is fully shown in Fig. 1.

E, Fig. 3, is a shaft or roller extending across under the front end of the table. F is a crank, by which the roller is turned. G is a toggle-joint, and acts as a brace, being connected to the under side of the section C' by a hinge, H. I, Fig. 1, is a leather strap, one end of which is connected to the front end of the table by the hooks J J', Fig. 3.

The dotted lines K in Fig. 1 represent an arm which supports the leaf B in a horizontal position, as shown in Fig. 1. This leaf can be used either as a brace, as in Fig. 3, or as an extension for the table, as in Fig. 1, on which to spread the fleece.

L is a small leaf, and is connected to the end of the section C by a hinge, M, indicated by the dotted lines in Figs. 1 and 2.

Having thus specified the several parts of the machine and its construction, I will now show the manner of using it, which is as follows: Balls of twine are placed in boxes 1, 2, and 3, Fig. 1. These boxes are immediately under the table, as indicated by the dotted lines. The twine is then passed up through the holes O O', and brought forward to the end of the table and down into the slots N N'. These slots are of the same number of and in line with the holes through which the strings *p* pass, one being shown in Fig. 1. The strap is then stretched lengthwise of the table, and narrow slots are cut in it, as shown, so that the twine can pass through for the purpose of tying the fleece, as will be hereinafter described.

The strings and strap being adjusted in the manner shown in Fig. 1, the fleece is then laid upon the table and doubled up by lapping over the sides until it is of the width of the strap. The sections of the table B' and C' are then raised up, as shown in Fig. 3, thus forming the sides of the fleece-box, and are held in this position on one side by means of the toggle-joint or brace G, and on the other by the section B, acting as a brace, the end resting on the cleat *a'*, as shown in Fig. 3. The small leaf L, at the back end of the table, is then raised, this leaf closing the end of the fleece-box, and is prevented from falling by the ends of the sides being rabbeted out, as seen at *b*, Fig. 1. It is also held from falling back by a pin, *c*, passing in a narrow groove in the end of the section C' when it is raised up. The object of this leaf is to prevent the two sides of the box from falling inward while the fleece is being rolled or folded up and tied. When this is partially done the end I' of the strap is brought over to the front and hooked on by means of the holes *i* in the end I' to the pins *a*, which are on the roller E, above described. The space caused by the bottom of the box or section C being shorter than the sides, as above stated, allows the strap to be passed freely down to the roller. When the strap is hooked onto these pins and the crank P turned, thus turning the roller, the strap is wound upon it at the same time the fleece is rolled up until it reaches the front end of the box, when it is tied by the strings referred to above, a pawl and ratchet-wheel on the inside of the frame, connected to the shaft of the roller E, and indicated by the dotted lines S, preventing the turning back of the roller while the fleece is being tied. A spring, T, under the pawl keeps it out from the wheel, and when required that the pawl should be on the ratchet it is forced down by the rod and button U, Fig. 2, the reaction of the strain on the roller being suffered to hold it there until the fleece is tied, when it is released by simply moving the crank forward. The strap is then unwound and again adjusted upon the table, as before described.

What I claim as my improvement, and desire to secure by Letters Patent, is—

The sectional table B B' C C' and leaf L, in combination with the brace G, strap I, and roller E, when arranged in the manner and for the purpose set forth.

JOHN PORTER.

Witnesses:
 JACOB HERSHEY,
 GEORGE PORTER.